US008888049B2

(12) United States Patent  
Vander Lind

(10) Patent No.: US 8,888,049 B2  
(45) Date of Patent: Nov. 18, 2014

(54) KITE GROUND STATION AND SYSTEM USING SAME

(71) Applicant: Google Inc., Mountain View, CA (US)

(72) Inventor: Damon Vander Lind, Oakland, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/719,198

(22) Filed: Dec. 18, 2012

(65) Prior Publication Data

US 2013/0221679 A1    Aug. 29, 2013

Related U.S. Application Data

(60) Provisional application No. 61/577,039, filed on Dec. 18, 2011.

(51) Int. Cl.
| | |
|---|---|
| *B64C 31/06* | (2006.01) |
| *B64F 3/00* | (2006.01) |
| *F03D 5/04* | (2006.01) |
| *F03D 11/04* | (2006.01) |

(52) U.S. Cl.
CPC . *B64C 31/06* (2013.01); *B64F 3/00* (2013.01); *F03D 5/04* (2013.01); *F05B 2240/921* (2013.01); *F05B 2240/917* (2013.01); *F03D 11/04* (2013.01); *Y02E 10/725* (2013.01); *Y02E 10/728* (2013.01); *Y02E 10/70* (2013.01)
USPC ........................................ 244/153 R; 290/55

(58) Field of Classification Search
CPC ....................................................... B64C 31/06
USPC ........................................... 290/55; 244/155 R
See application file for complete search history.

(56) References Cited

U.S. PATENT DOCUMENTS

| | | | | |
|---|---|---|---|---|
| 2,429,502 | A * | 10/1947 | Young | 244/154 |
| 2,433,344 | A * | 12/1947 | Crosby | 343/706 |
| 3,302,908 | A * | 2/1967 | Lazareff | 244/183 |
| 3,987,987 | A * | 10/1976 | Payne et al. | 244/153 R |
| 4,166,596 | A * | 9/1979 | Mouton et al. | 244/30 |
| 4,251,040 | A * | 2/1981 | Loyd | 244/154 |

(Continued)

FOREIGN PATENT DOCUMENTS

| | | | |
|---|---|---|---|
| EP | 45202 A1 * | 2/1982 | |
| EP | 391601 A * | 10/1990 | |
| FR | 2667904 A1 * | 4/1992 | |

OTHER PUBLICATIONS

International Search Report prepared by the US Patent Office in International Patent Application PCT/US2012/70424, mailed May 20, 2013.

*Primary Examiner* — Joseph Waks  
(74) *Attorney, Agent, or Firm* — McDonnell Boehnen Hulbert & Berghoff LLP

(57) ABSTRACT

A kite system with a ground station adapted for airborne power generation. The kite system may include a kite which includes one or more airfoils which have mounted thereon a plurality of turbine driven generators. The turbine driven generators may also function as motor driven propellers in a powered flight mode, which may be used during take-off, which may include aspects of vertical take-off and landing. A perch adapted to facilitate the take-off and landing may be used as part of the system. The perch may pivot such that the pivot is oriented towards the tension direction of the tether.

17 Claims, 9 Drawing Sheets

(56) References Cited

U.S. PATENT DOCUMENTS

| | | | | |
|---|---|---|---|---|
| 4,285,481 A | * | 8/1981 | Biscomb | 244/33 |
| 4,659,940 A | * | 4/1987 | Shepard | 290/55 |
| 5,480,108 A | * | 1/1996 | Amiand et al. | 244/115 |
| 6,781,254 B2 | * | 8/2004 | Roberts | 290/55 |
| 7,188,808 B1 | * | 3/2007 | Olson | 244/153 R |
| 7,287,481 B1 | | 10/2007 | Wrage et al. | |
| 7,675,189 B2 | * | 3/2010 | Grenier | 290/54 |
| 7,775,483 B2 | | 8/2010 | Olson | |
| 8,350,403 B2 | * | 1/2013 | Carroll | 290/55 |
| 8,453,966 B2 | * | 6/2013 | McGeer et al. | 244/110 F |
| 2007/0228738 A1 | * | 10/2007 | Wrage et al. | 290/44 |
| 2008/0048453 A1 | * | 2/2008 | Amick | 290/44 |
| 2009/0236470 A1 | * | 9/2009 | Goossen et al. | 244/115 |
| 2010/0013236 A1 | | 1/2010 | Carroll | |
| 2010/0026007 A1 | | 2/2010 | Bevirt | |
| 2010/0032947 A1 | | 2/2010 | Bevirt | |
| 2010/0032948 A1 | | 2/2010 | Bevirt | |
| 2010/0117371 A1 | | 5/2010 | Ippolito et al. | |
| 2010/0221112 A1 | | 9/2010 | Bevirt et al. | |
| 2010/0230546 A1 | | 9/2010 | Bevirt et al. | |
| 2010/0283253 A1 | | 11/2010 | Bevirt | |
| 2010/0295320 A1 | | 11/2010 | Bevirt | |
| 2010/0295321 A1 | | 11/2010 | Bevirt | |
| 2011/0024559 A1 | | 2/2011 | McGeer et al. | |
| 2011/0042508 A1 | | 2/2011 | Bevirt et al. | |
| 2011/0042509 A1 | | 2/2011 | Bevirt et al. | |
| 2011/0042510 A1 | | 2/2011 | Bevirt et al. | |
| 2011/0121570 A1 | | 5/2011 | Bevirt et al. | |
| 2011/0127775 A1 | | 6/2011 | Bevirt | |
| 2011/0260462 A1 | * | 10/2011 | Vander Lind | 290/55 |
| 2011/0266395 A1 | | 11/2011 | Bevirt | |
| 2012/0068013 A1 | * | 3/2012 | Affre De Saint Rome | 244/115 |
| 2012/0286102 A1 | | 11/2012 | Sinha et al. | |
| 2012/0287274 A1 | | 11/2012 | Bevirt | |
| 2013/0221679 A1 | * | 8/2013 | Vander Lind | 290/55 |

\* cited by examiner

KITE GROUND STATION AND SYSTEM USING SAME

CROSS-REFERENCE TO RELATED APPLICATIONS

This application claims priority to U.S. Provisional Patent Application No. 61/577,039 to Vander Lind, filed Dec. 18, 2011, which is hereby incorporated by reference in its entirety.

STATEMENT REGARDING FEDERALLY SPONSORED RESEARCH OR DEVELOPMENT

This invention was made with government support under Contract Numbers DE-AR0000122/AR0000243 awarded by Advanced Research Projects Agency-Energy (ARPA-E). The government has certain rights in the invention.

BACKGROUND

1. Field of the Invention

The present invention relates to a system and method of flying and perching tethered flying vehicles.

2. Description of Related Art

Crosswind kite systems comprising tethered wings (kites) can extract useful power from the wind for purposes such as, for example, generating electricity, lifting or towing objects or vehicles, etc. To provide or use consistent power, it may be desired to fly the kite in repeating trajectories (i.e., a limit cycle). It may also be desired to maintain the kite aloft and flying consistent trajectories during a large range of environmental conditions such as high wind speeds, large gusts, turbulent air, or variable wind conditions. However, take-off and landing of such kites can present difficulties, as the kites may not be well adapted for landings similar to that of an aircraft. Therefore, a mode of operation is desired so that a kite system can take-off, land, and operate safely in high and changing winds.

SUMMARY OF THE INVENTION

A kite system adapted for airborne power generation. The kite system may include a kite which comprises one or more airfoils which have mounted thereon a plurality of turbine driven generators. The turbine driven generators may also function as motor driven propellers in a powered flight mode, which may be used during take-off, which may include aspects of vertical take-off and landing. A perch adapted to facilitate the take-off and landing may be used as part of the system. The perch may pivot such that the pivot is oriented towards the tension direction of the tether.

DETAILED DESCRIPTION

A kite system incorporating a ground station for launching and landing the kite is disclosed. Kite systems incorporating rotors on the kite are being developed for numerous purposes, including for the generation of power, use as traction or motive devices, and use for surveillance or observation. Some kite systems are designed to generate power by flying a crosswind flight path, using the onboard rotors to generate power using onboard electrical generators. Generated power is then sent down the tether and fed into batteries or the grid. To launch and land, the kite system uses power applied to the onboard rotors to provide static thrust with the onboard rotors, hovering the kite.

To support the landing of a tethered craft, the tether is reeled in on a winch which is attached to a freely-pivoting perch base. As the winch turns, it causes the freely pivoting base to turn in an opposite orientation until the tether engages a levelwind adapted to evenly wind the tether onto the winch drum, which orients the perch base to point towards the kite, and which winds the tether in organized wraps onto the winch. Once the tether is fully wound in, the kite contacts perch buckets which orient and guide the wing into a highly constrained interface at the bottom of the perch buckets, in which the wing may rest once power to the rotors is turned off. The reverse operation is used to re-launch the kite for continued operation. After the kite launches from the perch buckets and the tether is reeled out, the winch is turned beyond the point at which the tether engages the levelwind, and tether disengages the levelwind. The tether then is only attached to the ground station by a gimbal, which allows free rotation in elevation, azimuth, and axial rotation. The gimbal ensures that no surface tether wear occurs during system flight operation.

Figure 1:
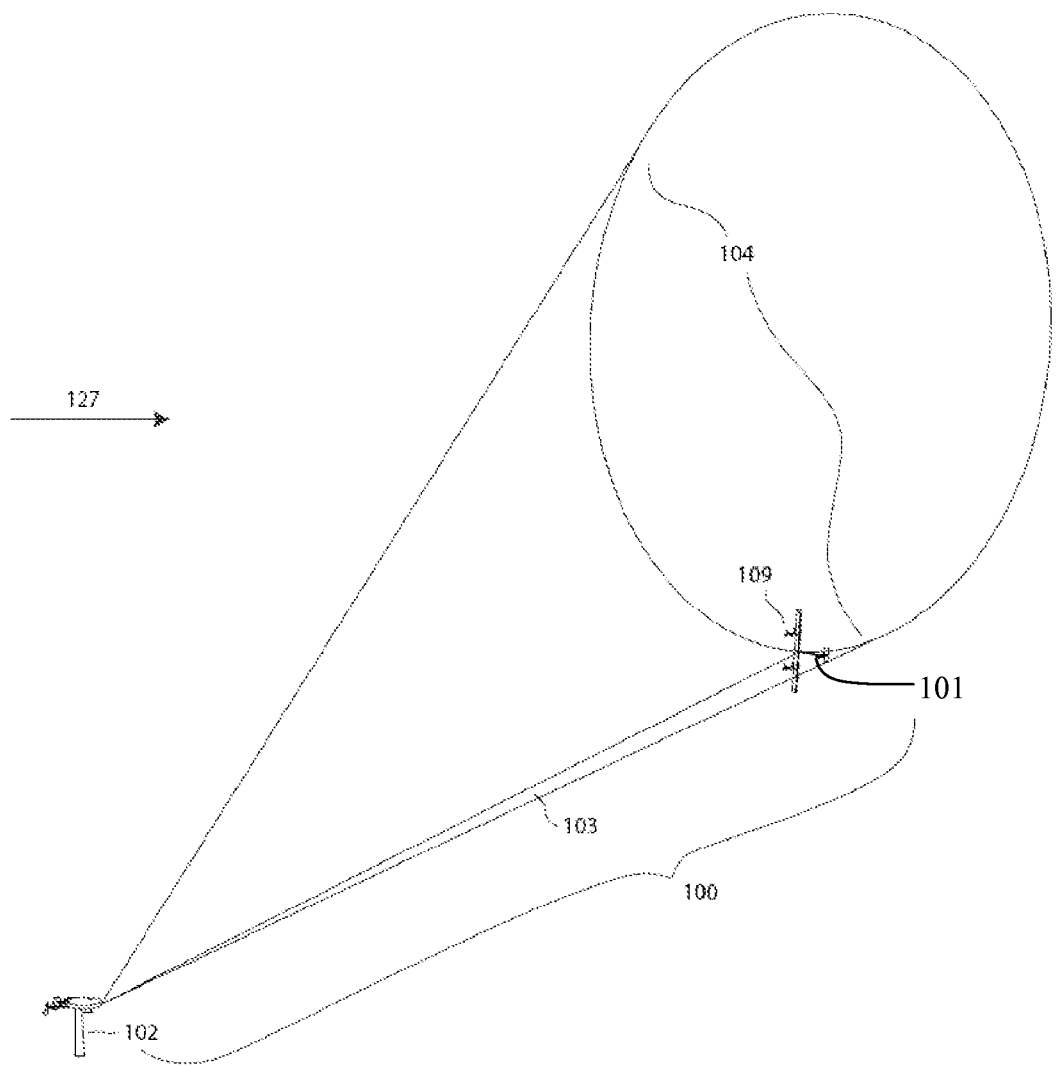
FIG. 1 is a diagram depicting a kite system according to some embodiments of the present invention.

FIG. 1 is a diagram depicting an embodiment of a kite system, comprising a kite 101, a ground station 102, and a tether 103. The kite 101 flies along pseudoperiodic flightpath 104 which is, in some embodiments, a circle. In some embodiments the kite system 100 is a kite-based power generating system. In other embodiments, ground station 102 is mounted on a ship, train, or other vessel. In some embodiments, kite system 100 is a kite system used for surveillance, transportation, observation, traction, power generation, or any other use. In a typical embodiment, the kite 101 is a rigid airfoil which may have ailerons and a tail adapted for control of the kite 101. The kite 101 may have four generators 109 each adapted to be driven by a three bladed turbine. The four generators may be configured such that there are two generators on each side of the center of the kite, and that on each side there is one turbine/generator assembly above the airfoil, and one turbine/generator assembly below the airfoil. In an airborne power generation mode, the kite 101 may fly in a cross-wind flight pattern which provides apparent wind speed to the turbines well in excess of the ambient wind speed. The generators 109 are adapted to be electric motors in another flight mode, wherein the three bladed turbines then act a thrust providing propellers. The kite 101 launches from ground station 102 under thrust from on-board rotors 109 in a hovering mode of flight, and tether 103 is reeled out to its full working length, as depicted by tether 103. The launching of the kite 101 from the ground station 102 is similar to a vertical take-off mode, although the mode is not a free flight mode as the tether provides a force against the system. The system may be adapted to utilized the tether force as a balancing force against other control forces during the launch of the kite 101 from the ground station 102. After launching, the kite 101 operates to perform its function. In the depicted embodiment, the kite 101 flies along a flightpath 104 at a multiple of the ambient wind speed 127 at a location substantially downwind of the ground station 102. In this airborne power generation mode, kite 101 uses onboard rotors 109 to turn the on-board generators and generate power, which is conducted down conductors embedded in the tether 103. After an automatic control system or human operator determines that the kite 101 should land, the kite 101 is returned to a hovering mode of flight, again in which thrust from the rotors 109 counters gravity and maintains the kite 101 aloft. While hovering, the ground station 102 reels in the tether 103 such that the kite 101 may land on the ground station 102 once the tether 103 is fully reeled in.

Figure 2:
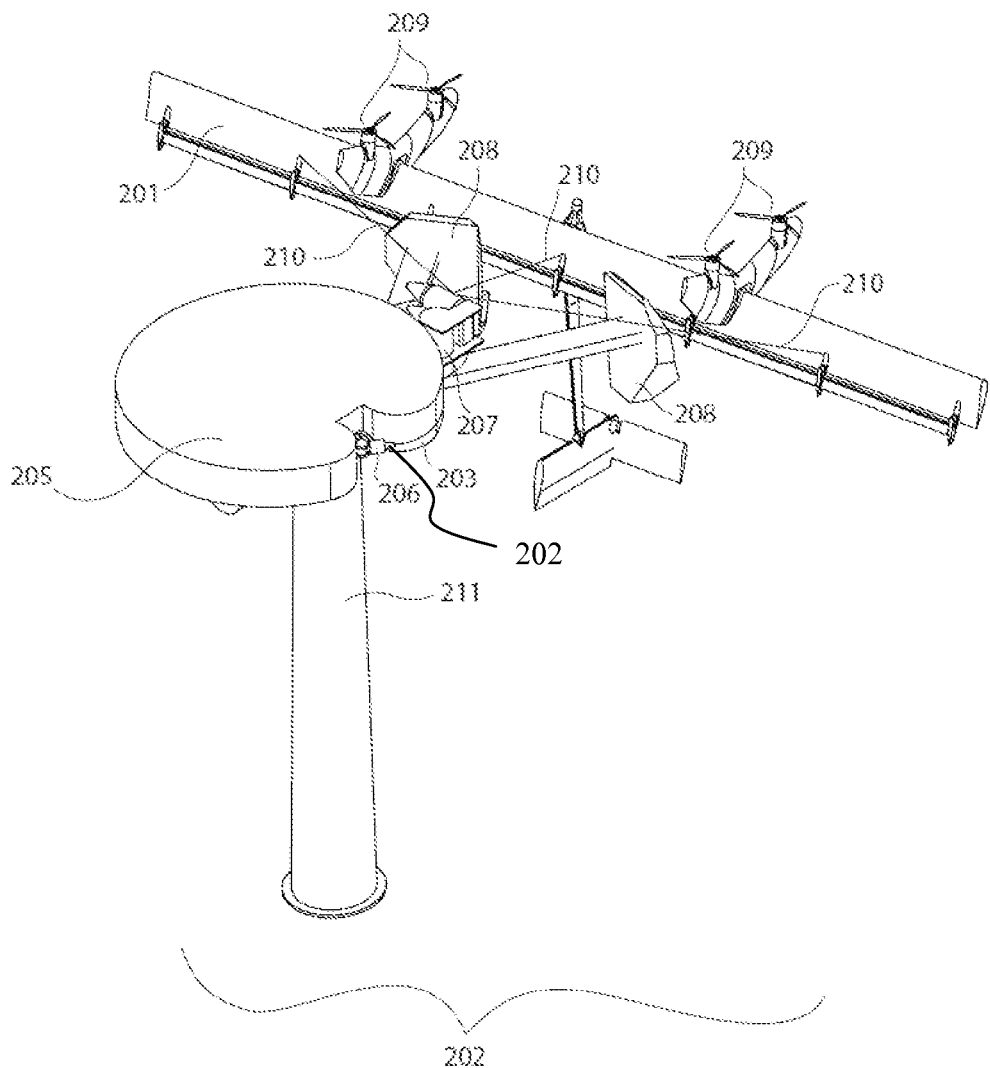
FIG. 2 is a depiction of a perch for a kite system according to some embodiments of the present invention.
Figure 8:
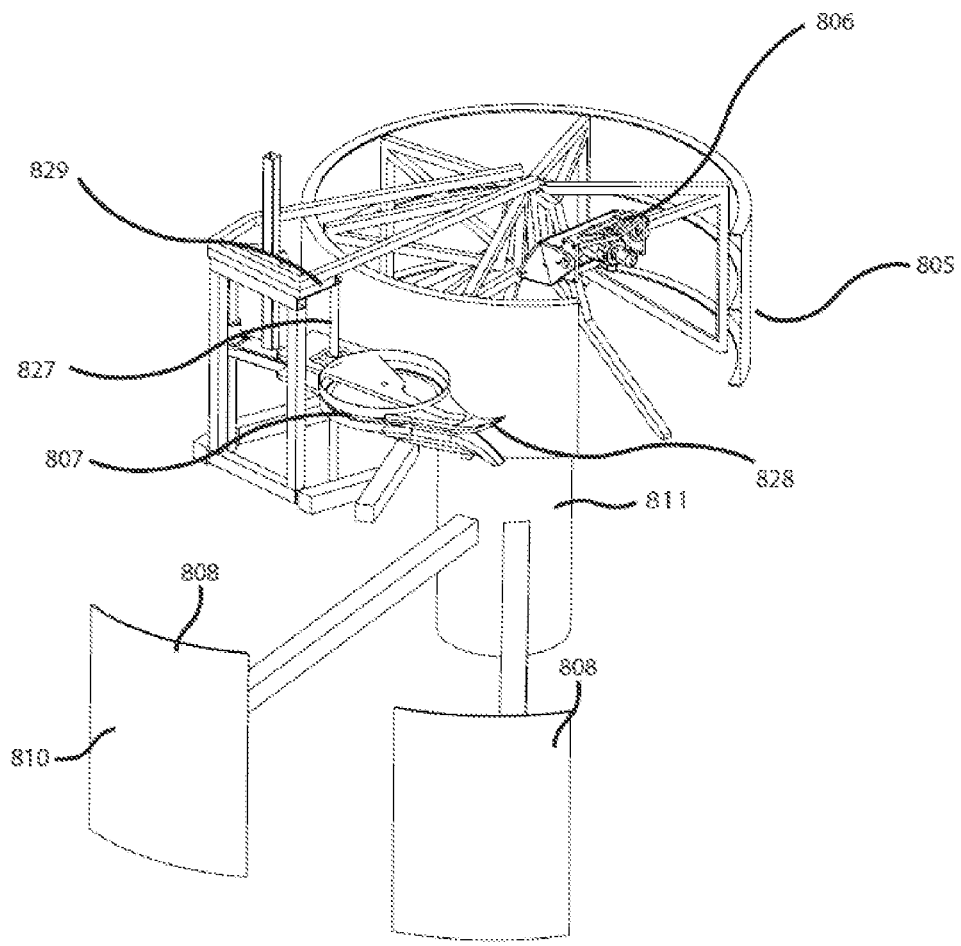
FIG. 8 is an illustration of perch buckets according to some embodiments of the present invention.

FIG. 2 is a detailed depiction of a perch (e.g. perch 102 in FIG. 1) for a kite system (e.g. the kite system 100 in FIG. 1). The perch 202 comprises a winch 205. In some embodiments, a ground-side gimbal 206, to which the ground-side of tether 205 is attached, is embedded in the winch 205. The winch 205 is used to reel in and out the tether 202 when the kite system 200 launches and lands the kite 201. The ground-side gimbal 206 comprises a set of bearings which allow the angles of connection of the tether 202 to the winch 205 to change without inducing flex within the tether 202, and instead pivoting the base of the tether 202 on bearings within the ground-side gimbal 206. In some embodiments, the ground-side gimbal 206 also comprises a bearing allowing the tether 202 to rotate about the tether axis, thereby allowing the tether 202 to de-twist in cases in which the flightpath 104 is topologically circular. In some embodiments, the ground-side gimbal 206 further comprises a slipring which allows electrical signals to be passed from the tether 202 to the winch 205 as the ground-side gimbal 206 allows the tether 202 to rotate about the tether axis. The ground-side gimbal 206 is embedded within the winch drum of the winch 205, and the shape and curvature of winch drum of the winch 205 are adjusted such that tether 202 winds over or past gimbal 206 without touching gimbal 206. In some embodiments, the winch drum of the winch 205 is substantially cylindrical, and the levelwind 207 is actuated in a manner which avoids tether 202 laying over ground-side gimbal 206 as it is wound onto winch 205. The wound tether, which would overlay (and hide) the gimbal, is not shown in FIG. 2 for clarity of illustration of the recess in the winch drum. A wound tether would have been seen, if shown, wound around the exterior of the winch drum. A further embodiment of the winding aspects of the winch is seen in FIG. 8. In some embodiments, such as the embodiments depicted, the winch 205 rotates about a vertical axis. In other embodiments, the winch 205 rotates around a horizontal axis.

The ground station 202 further comprises a levelwind 207, which guides the tether 202 onto the drum of the winch 205. In some embodiments, the levelwind 202 comprises two rollers with a horizontal axis that constrain the tether 202 to a small range of vertical positions at a given time as it winds onto the drum of the winch 205, and a vertical axis roller which bends the tether 202 from a radial orientation to the axis of the winch 205 to an azimuthal orientation to the axis of the winch 205. The levelwind 207 is actuated to move slowly along the axis of the drum of the winch 205 so as wind the tether 202 helically onto the drum of the winch 205. In an exemplary embodiment, only a single layer of the tether 202 is wrapped over a given area on the drum of the winch 205.

In an exemplary embodiment, the length of the tether 202 is 160 meters. The radius of the winch drum is 0.9 meters. The tether diameter is 9 mm. In such an embodiment, the winch drum would take in 5.64 meters of tether per revolution, and the tether would take approximately 28.25 wraps around the drum to be wound in fully for the perched mode. The winch drum axis is vertical, and the height of the winch drum is approximately 0.5 meters. The level wind would be adapted to wrap each successive wrap of the tether such that the tether does not overlay itself as it is wound around the winch drum.

Figure 6:
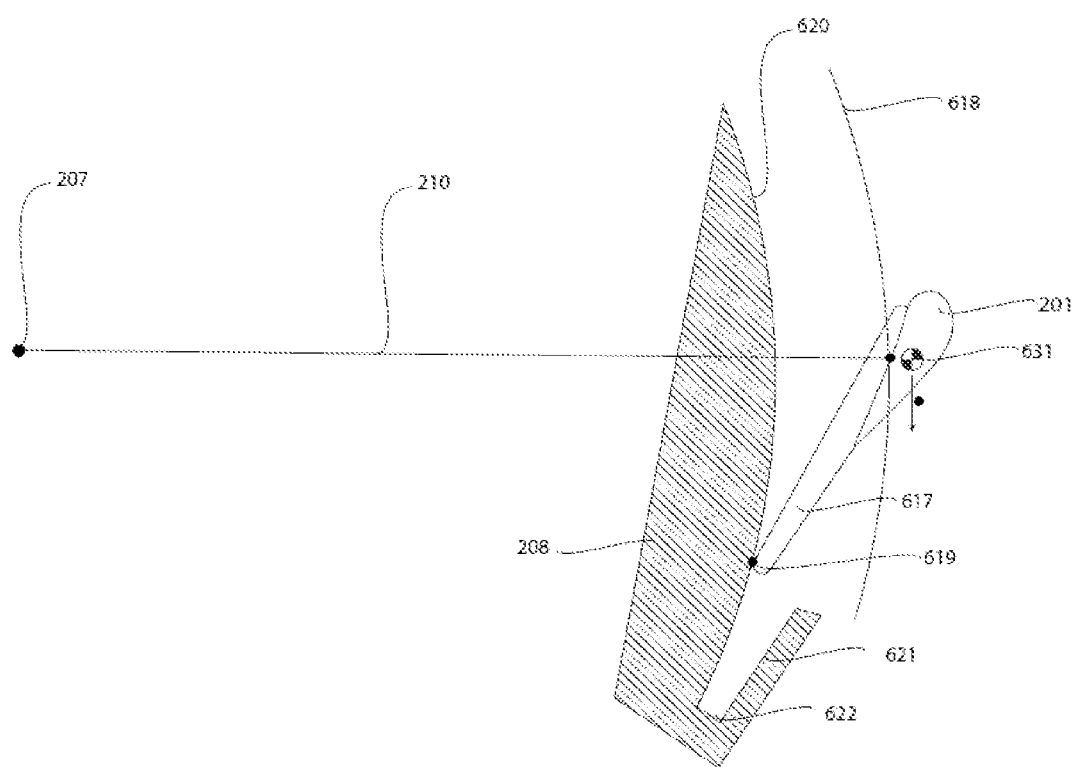
FIG. 6 is a view of a perch bucket according to some embodiments of the present invention.
Figure 9:
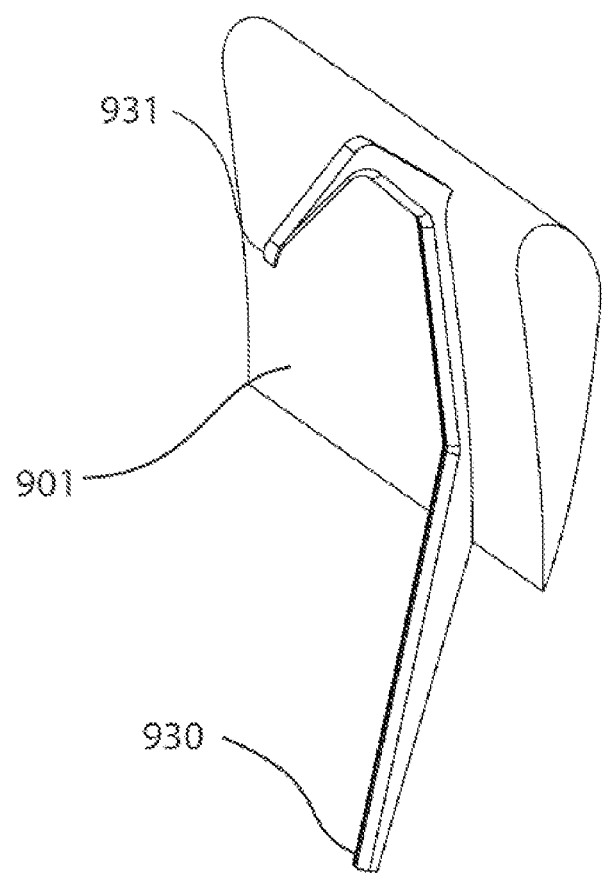
FIG. 9 is an illustration of perch hooks according to some embodiments of the present invention.

The ground station 202 further comprises perch buckets 208. Perch locating pegs on the wing of kite 201 locate against and into the perch buckets 208. The perch buckets 208 and the perch locating pegs are shaped such that the wing of the kite 201 may rest in the perch buckets 208 without external support from any other points, such as the bridles 210, which connect the tether 202 to the kite 201. In some embodiments, a third perch bucket 208 captured a perch locating peg located on the tail of the kite 201, or located on another point on the kite 201. A first embodiment of the perch buckets is seen in FIG. 6 and described in further detail below. A second embodiment of the perch buckets is seen in FIG. 9 and described in further detail below.

Figure 3:
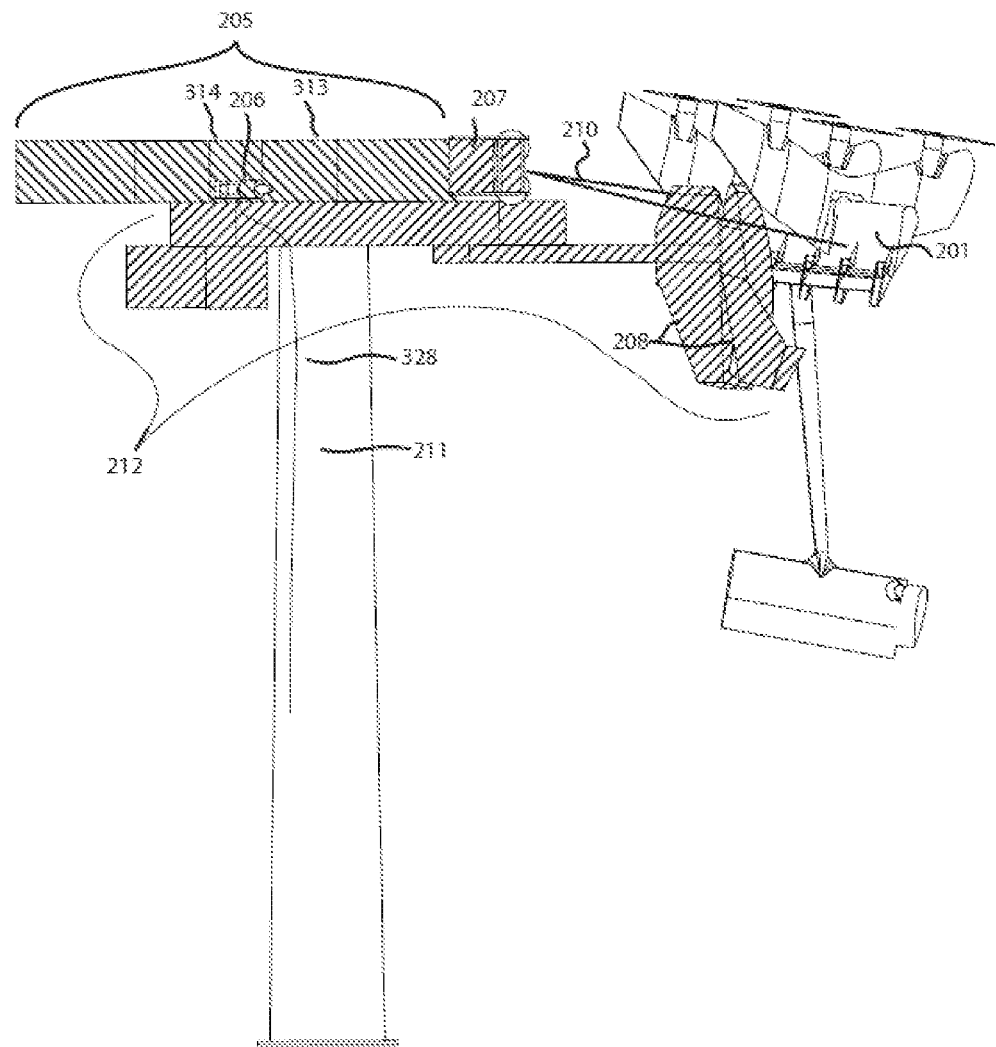
FIG. 3 is side view depiction of a ground station for a kite system according to some embodiments of the present invention.

FIG. 3 is a partial cross-sectional view depicting the ground station 202, in a manner which makes various moving parts apparent. The ground-station 202 comprises a perch base assembly 212, upon which the winch 205, the levelwind 207, and the perch buckets 208 are mounted. The perch base assembly 212 rotates freely about tower 211, about a vertical perch base axis 313. The winch 205 is driven by a motor which applies a torque between perch base 212 and the winch 325, to rotate about the winch axis 314. The ground-side gimbal 206 is mounted on the winch 205 and turns with the winch 205. In some embodiments, the winch axis 314 is the same axis as the central perch axis 313. In some embodiments, the axes are different. The levelwind 207 is actuated on an axis parallel to the winch axis 313 as the tether 202 is reeled onto the winch 205, such that tether 202 is wound helically onto the drum of the winch 205. In some embodiments, the perch buckets 208 are mounted on thin flexible beams in order to reduce impact force as the kite 201 lands into and engages the perch buckets 208. In some embodiments, a slipring connects electrical signals and power from tether 202 through the winch axis 314. In other embodiments, a free set of power wires 328 is fed through the center of the bearings for the winch 205 and hangs down inside the tower 211, where the free length allows the power wires 328 to accumulate turns as the perch base 212 and the winch 205 accumulate turns. In some embodiments, the power wires 328 are pre-stressed in the same manner as a retracting phone cord to ensure orderly twisting and untwisting during operation.

In an embodiment such as seen in FIGS. 2 and 3, of note is that the attachments above the tower 211, namely the perch base assembly 212 and the winch 205, are free spinning relative to the tower 211. Also, a single actuator, is used to drive the winch 205 with its drum relative to the perch base assembly 212. Because of the free spinning aspect of the upper attachments to the tower 211, the force on the tether (due to the tension in the tether apparent from restraining the flying kite) will cause the attachments on the tower 211 to rotate such that the tether as it exits the upper attachments is facing towards the tether tension direction. In the case of a fully deployed tether being held by the gimbal 206, the upper attachments will rotate in response to changes in tether location such that the gimbal is facing the direction of the tether tension. In a cross wind flying paradigm, the kite will move relative to the ambient wind direction, and the gimbal, and the upper attachments to the tower, will tend to follow the tether as it moves. In the case wherein the tether is being spooled out or in, the tether will be coupled to the upper attachments through the levelwind. In these cases, the levelwind will rotate around the vertical axis to follow the tether as it moves.

With the use of a single actuator/motor to wind the tether, and with the use of the free spinning upper attachments on the tower, a simple system has been constructed to implement numerous important functions for the system. Using the example of the function of winding in the tether from a fully spooled out condition, the motor will rotate the perch base assembly 212 relative to the winch 205. Neither of these, the perch base assembly 212 nor the winch 205, are rotationally constrained relative to the tower 211. Rather, the rotation of the winch 205 relative to the perch base assembly 212 is constrained. The rotation of the winch relative to the perch base, to which the levelwind is coupled, allows for spooling in or spooling out of the tether around the drum of the winch.

Figure 4:
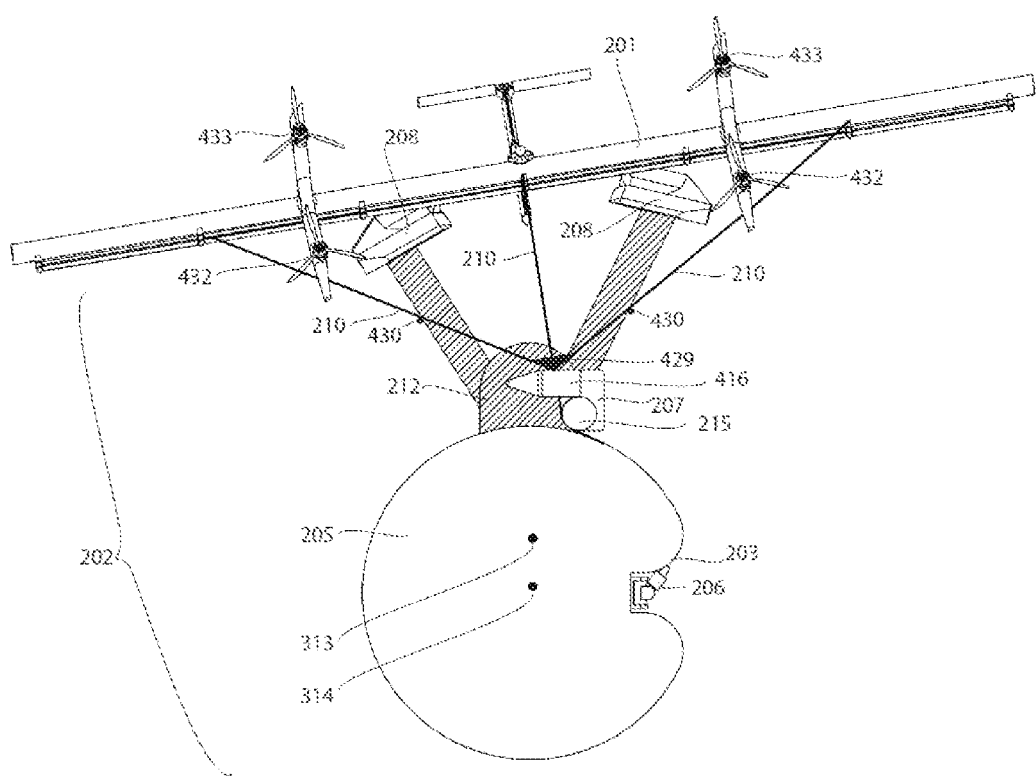
FIG. 4 is top view depiction of a ground station for a kite system according to some embodiments of the present invention.

FIG. 4 is a top-view of a ground station 202 with a kite 201 perched therein, according to some embodiments of the present invention. The following discussion illustrates the launching of a kite from the ground station. To launch the kite 201, a motor applies a torque between the winch 205 and the perch base assembly 212 in a manner which turns the winch 205 counterclockwise. As the winch 205 turns counterclockwise, the tether 202 reels off of the winch 205 and through the level wind 207. The orientation of the level wind 207 between the kite 201 and the perch base axis 313 applies a torque from tension on the tether 202 which orients the perch base 212. If the perch base 212 rotates counterclockwise relative to the direction of tension from the tether 202, the force on the tether 202, applied to the level wind 207, creates a torque about the perch base axis 313 which turns the perch base 212 clockwise, and vice versa. The levelwind 207 and the perch buckets 208 are located such that no torque is exerted by the tether 202 about the perch base axis 313 when the perch buckets 208 are aligned with the wing of the kite 201 for landing. In some embodiments, as the bridles 210, which connect the tether 202 to the kite 201, near the levelwind 207, orient the kite 201 in kite body yaw as a segment of bridles 210 enter or engage with the levelwind. In some embodiments, a block or rigid structure 429 connects the bridles 210 to the tether 202, and engages with the levelwind 207 or some other mechanism affixed to the perch platform 212 to constrain the kite in kite body yaw, kite body roll, or along some other axis.

In some embodiments, a set of guides separate from the levelwind 207 engage with the bridles 210 during landing. For example, the goalposts 430 may constrain the kite 201 in kite body yaw by abutting the bridles 210 during landing. In some embodiments, a tether block 429 and goalposts 430 are not used. This allows the bridles 210 to be faired with an aerodynamic fairing, increasing the performance of the kite 201 when flying at a large multiple of wind speed.

The kite 201 further comprises rotors 209, which can be can be divided into upper rotors 433 and lower rotors 432. In some embodiments, the upper rotors 433 supply less thrust, and the lower rotors 432 supply more thrust as the kite 201 interfaces with the landing buckets 208. This applies a greater force between the landing pegs and perch buckets 208, as described in greater detail in FIGS. 6 and 7.

Figure 5:
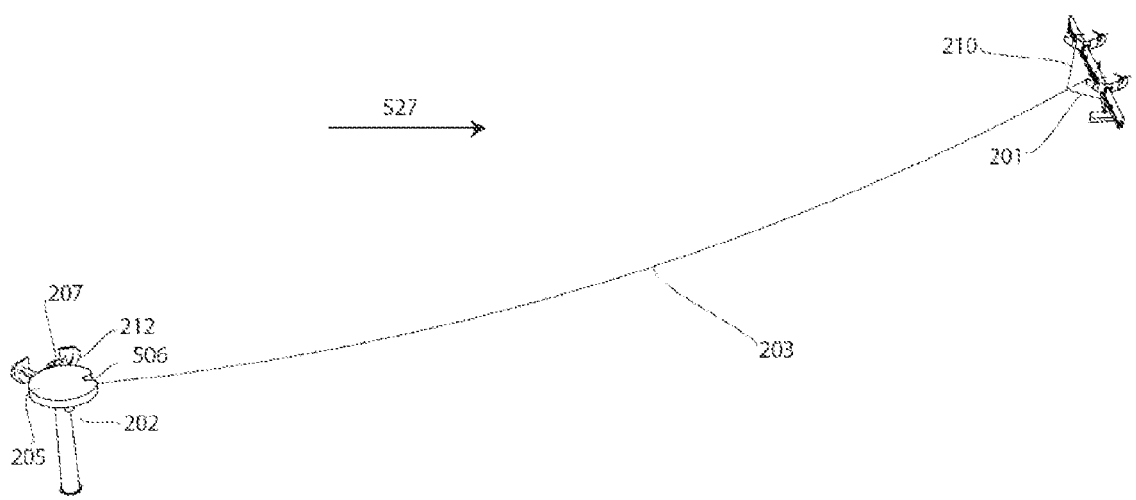
FIG. 5 is a diagram depicting a kite system according to some embodiments of the present invention.

FIG. 5 is a depiction of an embodiment of a kite system incorporating ground station 202. The kite 201 is depicted in a hovering mode of flight, in which rotors 209 are turned to provide thrust in a predominantly downward direction, which keeps kite 201 aloft. An automatic control system sends control signals to the rotors 209 which stabilize the kite 201 in the hovering mode of flight. The bridles 210 connect the kite 201 to the tether 203. The kite 201 is hovered substantially downwind of the ground station 202, except in situations where wind 527 is weak or nonexistent. If the kite 201 rolls about the kite body roll axis, the length of bridles 210 from the kite 201 create a torque due to tension on the tether 203, on the kite 201 about the kite roll axis. The ground station 202 is depicted in an orientation for launch in which the winch has rotated counterclockwise 270 degrees beyond the point at which the tether 203 engages/disengages with the levelwinder 207. This in turn means that it is depicted in an orientation in which the torque due to the offset of ground-side gimbal 206 from the perch platform rotation axis has rotated the perch platform 212 some 270 degrees clockwise from the point at which the levelwinder 207 engages the tether 202. In some embodiments, the winch 205 rotates only 30, 90, 180 or some other number of degrees beyond the point at which tether 203 engages with the levelwind 207. To provide further example, note that, were the winch 205 to rotate 10 degrees clockwise as viewed from above, the perch platform 212, which is on a free-turning bearing, would then be turned a torque from the tension of the tether 203 being applied in a direction not intersecting the perch platform axis of rotation. In some embodiments, the perch platform 212 incorporates a countermass to balance the perch platform 212 about the perch platform rotation axis, such that any offset of the perch platform rotation axis from the gravity vector contributes little to the total torque applied about the perch platform rotation axis. Note that, in the hovering mode of flight, in the system as depicted in FIG. 5, after the winch 205 turns 270 degrees clockwise, the tether 203 engages the levelwind 207. After this, the perch buckets 208 are aligned with the tether 203 and the kite 201. If the winch 205 continues to turn clockwise, the tether 203 is rolled onto the winch 205 through the levelwind 207, and the perch buckets 208 (and the perch platform 212) remain aligned with the tether 203.

FIG. 6 depicts a side view of an embodiment of a perch bucket 208 as the kite 201 engages with the perch buckets 208 during landing. Note that for image clarity, the cross section of the wing of kite 201, at which, in the depicted embodiment, the landing pegs 617 which interface the wing 201 to the perch 208, are attached to the wing of the kite 201. The bridles 210 attach the kite 201 to the tether 203 at the sheave exit point of the levelwind 207. As the wing 201 hovers to land, in some embodiments control of altitude is limited or challenging. The landing pegs 617 contact the perch backstop 620 at a point between depicted peg contact point 619 and the top of perch backstop 620. The perch backstop 620 is curved to follow the bridle radius 618 such that the pitch of the kite 201 about the kite body pitch axis is the same or is slowly varying as the peg contact point 619 moves along the perch backstop 620. The perch backstop 620 is further located such that the pitch angle at which the kite 201 is maintained is pitched back. The perch buckets 208 further comprise a perch bottom stop 622 and a perch engagement surface 621. During landing, after engaging the perch backstop 620 at the perch contact point 619, the kite 201 reduces thrust and the perch contact point 619 slides down the perch backstop 620 until the landing pegs 617 contact the perch bottom stop 622. At this point, the rotors, such as rotors 209, on the kite 201, are turned off, and the kite 201 rests upon the perch bottom stop 622. Perch bottom stop 602 is substantially offset on a horizontal axis from the kite center of mass 631, such that the gravitational force on the kite 601 leans the landing pegs 617 against the perch engagement surface 621. The kite 201 is thus safely perched on the perch base.

In some embodiments, the landing peg 617 may not engage the perch backstop 620 initially during landing, and instead the perch backstop 620 and the perch engagement surface 621 are merely shaped to guide the landing peg 617 towards the perch bottom stop 622 as the kite 601 lands. In some embodiments, a third perch bucket 608 engages a perch landing peg located on the tail of the kite 601. In some embodiments, the landing pegs 617 are attached to the kite 601 on its main wing, or on its rotor support pylons, or on its tail, or on its fuselage, or on any other point on the kite 601. In other embodiments which are substantially similar to the one depicted in FIG. 6, the perch engagement surface 621 is oriented such that the bridles 610 become slack, or not under tension, when the kite 601 is fully engaged with the perch buckets 608 at the perch bottom stop 622. In other embodiments, the winch 505 is commanded by the automatic control system to reel out a small distance of tether when the kite 601 is fully engaged with the perch buckets 608 at the perch bottom stop 622 in order to off load the kite structure, while in other systems, tension remains on the bridles 610 after the kite 601 has landed.

Figure 7:
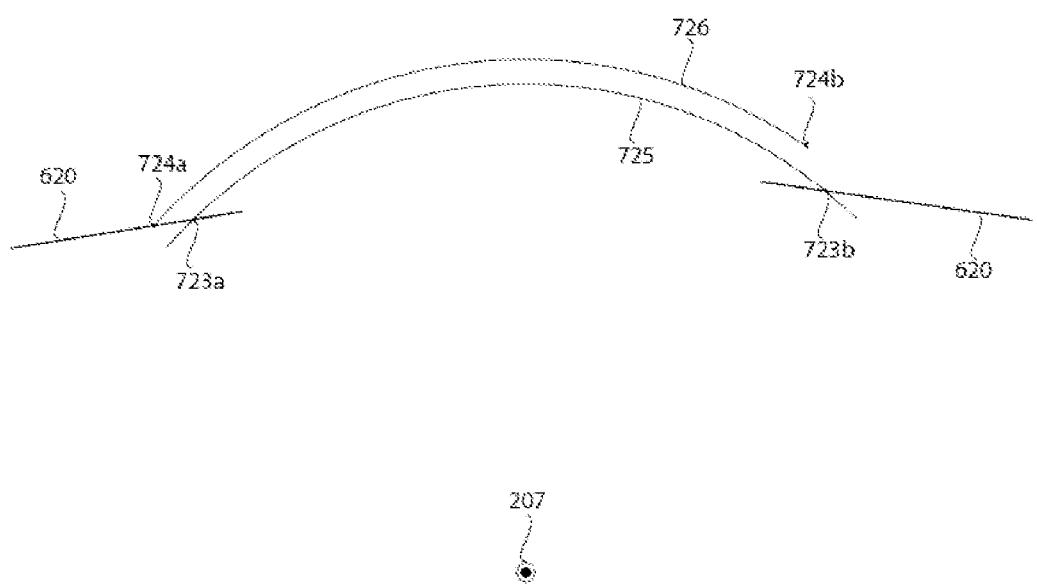
FIG. 7 is a diagram depicting a motion study and the vertical orientation of perch backstops according to some embodiments of the present invention.

FIG. 7 is a diagram depicting a motion study and the vertical orientation of the perch backstops 620, as shown from a top view. Contact points 723a and 723b are contact points substantially similar to landing peg contact point 619. An arc 725 depicts the arc upon which contact points 723a and 723b must lie given the constraint of the bridles, which attach to the tether at levelwind exit point 207. As perch contact point 619 is substantially below the connection of bridles 610 to wing 601, and as bridles 610 are of fixed length, the kite 201 must pitch forward for contact point 619 (here depicted as contact points 723a and 723b) to move radially inward our outward from arc 725. Contact points 724a and 724b depicted along arc 726.

In some embodiments, the perch backstops 620 are oriented as depicted in FIG. 7 such that arc contact point 723a must move from its original radial arc (725) to a greater radial arc (726) as the perch contact point 723 slides on a horizontal axis along perch backstop 720. Perch contact point 724b depicts the location to which the second perch contact point 723b is moved when perch contact point 723a moves to perch contact point 724a. Note that perch contact point 724b is off the surface of perch backstop 720, such that perch backstop need not exist in between target perch contact points 723a and 723b. This configuration allows perch backstops 620 to be smaller than they would otherwise need to be to constrain and guide the wing during perching.

As the perch contact point 723a/724a slides along perch backstop 620, the perch backstop 620 exerts a normal force 734 on the perch contact points 723a/724a. Note that the normal force 734 is not along the radial direction about arc 726, and that the normal force 724 has an azimuthal component along arc 726, which accelerates the kite contact point 723a/724a and thus the kite azimuthally to the point where perch contact point 723b exerts a countering force. Thus, the orientation of perch backstops 620 as viewed from above, in an orientation which is not tangent to arc 725 or arc 726, provides stability and orientation to the kite about the kite roll axis as the kite lands in the perch buckets.

FIG. 8 is a diagram depicting another embodiment of a ground station for an airborne wind energy system. This embodiment comprises a levelwind 807 which comprises a single pulley mounted on a pivot, such that the levelwind may track vertical motions of the tether. The levelwind 807 is supported by steel rails 827, and driven by a leadscrew attached to the same drivetrain which drives the winch. The winch drum 805 comprises grooves in which the tether rests, and is guided into by the levelwind. Portions of the winch drum adjacent to the gimbal have been omitted for clarity of illustration of the interior portion of the winch. The levelwind 807 further comprises levelwind guides 828 which guide the tether into the levelwind pulley. The leadscrew and drivetrain are oriented such that the levelwind moves upward as the tether is reeled out. As the levelwind reaches its maximum extent at the top of its range of motion, it hits a top stop 829, which prevents the levelwind from pivoting about its pivot, and holds the levelwind level. In the situation in which the levelwind is beginning to engage the tether during reel in, the top stop 829 holds the levelwind level such that the tether is guided into the levelwind pulley 830 by the levelwind guides 828. This embodiment further comprises a ground-side gimbal 806 mounted inside the steel frame of the winch drum 805. The winch drum 805 comprises an aluminum surface with plastic grooves screwed into the aluminum surface.

This embodiment further comprises the perch buckets 808, which are curved about the vertical axis. The perch buckets are curves at a radius of curvature similar to the length of the bridles on the kite, while the perch panels are angled such that the kite side interfaces must, when the tether is fully reeled in, rest at only a single azimuthal location on the perch panels. This embodiment has a drum diameter of 1.8 meters, perch panels with a total area of 0.7 square meters each, a levelwind with a pulley of diameter 0.7 meters, and a drum height of 0.9 meters. The perch panels are mounted 1.5 meters from the mouth of the levelwind.

FIG. 9 is a diagram depicting the wing side interface of the kite for use with an embodiment of perch buckets such as that seen in FIG. 8. The wing side interface comprises a peg 930 which contacts the perch buckets, and a hook 931 which hooks over the top of the perch buckets. The peg 930 and hook 931 are bonded to the main wing structure of the kite 901. In some embodiments, the pegs 930 are integrated into the fuselage of the kite or the hooks are integrated into the pylons holding the motors on the kite. In some embodiments, the perch buckets comprise two buckets which are at angles to the mean radius of contact as described in FIG. 7. In other embodiments, the two perch panels are merged into a single perch panels with an angle separating the left half of the perch panel with the right half of the perch panels. In some of these embodiments, a single landing peg interfaces with both halves of the perch panel, and the hooks 930 hook over an upper surface. This upper surface might be the top of the perch panels, or might be a separate surface like a pipe or tube, or other structure. In contrast to the embodiment illustrated in FIG. 6, wherein the wing is supported from lower end of the peg when perched, in the embodiment of FIG. 9 the wing is supported from the hooks on the top of the pegs when perched.

Although the foregoing embodiments have been described in some detail for purposes of clarity of understanding, the invention is not limited to the details provided. There are many alternative ways of implementing the invention. The disclosed embodiments are illustrative and not restrictive. As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A kite system comprising;
    a kite, said kite adapted to fly using a tether, and wherein said kite includes pegs on a wing of said kite;
    said tether coupled to said kite on a first end, said tether coupled to a ground station on a second end;
    said ground-station for launching, landing, and storing the kite, wherein said ground station comprises:
        a winch; and
        a perch platform, wherein said perch platform comprises perch buckets that orient and guide the kite for launching, landing, or storing the kite, wherein said pegs on the wing of said kite are located against and into the perch buckets for landing or storing the kite in a vertical orientation.

2. The kite system of claim 1 wherein said pegs are adapted to interface with said perch buckets when said kite is perched on said perch platform.

3. The kite system of claim 1 wherein the perch platform pivots around a vertical axis.

4. The kite system of claim 1 wherein said ground-station further comprises a tower, wherein said perch platform and said winch are mounted on said tower.

5. The kite system of claim 4 wherein said winch comprises a ground-side gimbal, wherein said winch is coupled to said tether.

6. The kite system of claim 4 wherein said winch and said perch platform are free to rotate relative to said tower about a vertical axis.

7. The kite system of claim 6 wherein said tether is spooled in or out from said ground station due to motion of said winch relative to said perch platform about a vertical axis.

8. The kite system of claim 7 wherein said tether comprises electrical conductors, said electrical conductors coupled to said kite on a first end, said electrical conductors coupled to said ground station on a second end.

9. The kite system of claim 8 wherein said electrical conductors are further routed down through said tower.

10. The kite system of claim 7 further comprising a bridle system between said tether and said kite.

11. The kite system of claim 10 wherein said winch further comprises a winch drum around an outer periphery of said winch, wherein said tether is wound around said winch drum as said tether is spooled in from a deployed kite position to a perched kite position.

12. The kite system of claim 11, wherein said kite comprises turbine driven generators adapted to generate electrical energy when said kite is flying.

13. The kite system of claim 12 wherein said turbine driven generators are adapted to operate as motor driven rotors in take-off or landing modes.

14. The kite system of claim 4 further comprising a bridle system between said tether and said kite.

15. The kite system of claim 1, wherein said perch buckets comprise one or more vertical backstops.

16. The kite system of claim 15, wherein said vertical backstops are curved to allow said kite to remain at a substantially similar pitch angle over a range of contact heights as said kite is perched onto said ground station.

17. The kite system of claim 1, wherein the perch buckets are mounted on flexible arms adapted to absorb impact as said kite contacts the perch buckets.

* * * * *